March 5, 1968   C. H. FLISCH   3,371,773
CONTAINERS
Filed Aug. 17, 1966   2 Sheets-Sheet 1
Fig.1
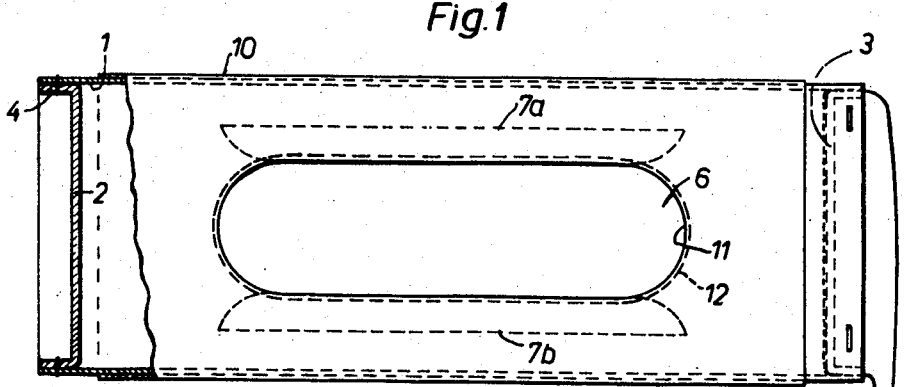
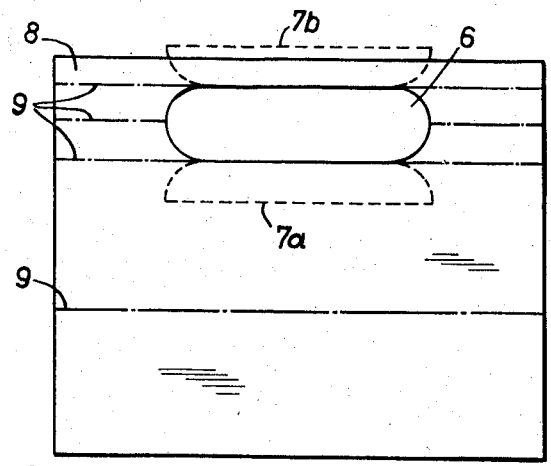
Fig.2
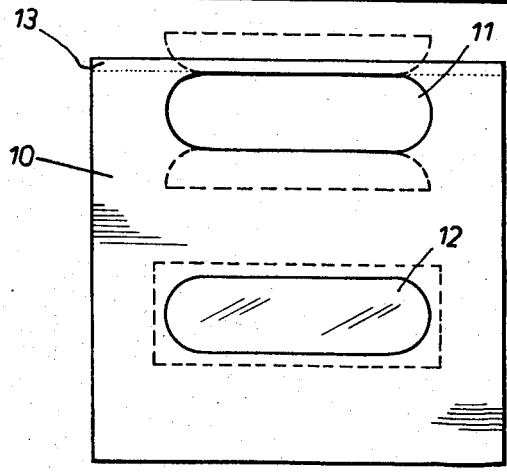
Fig.3

March 5, 1968  C. H. FLISCH  3,371,773
CONTAINERS

Filed Aug. 17, 1966  2 Sheets-Sheet 2

UNITED STATES PATENT OFFICE 3,371,773
Patented Mar. 5, 1968

3,371,773
CONTAINERS
Carl Hermann Flisch, Aeuli, Maienfeld,
Graubunden, Switzerland
Filed Aug. 17, 1966, Ser. No. 573,069
9 Claims. (Cl. 206—45.31)

ABSTRACT OF THE DISCLOSURE

A container having an inner shell mounted in a rotatable outer jacket, the shell and jacket having openings in the sides thereof which can be placed in registry for loading and unloading storable material in the inner shell.

---

The invention relates to a container in which easily perishable and/or bruisable produce, such as berries, fruits, and soft vegetables can be shipped and stored.

Up to the present time such produce has been packed in undesirably large quantities or in containers not suited to their contents. Far too often the quality is impaired by excessively long shipment or by repacking of the contents several times. The produce is insufficiently protected against shaking, pressure, and unfavorable temperatures.

In accordance with the invention, there is provided a container for the shipping, storing and selling of produce which comprises a cylindrical shell of flexible material mounted in a rotatable outer jacket, said shell having two spaced parallel fold boarders extending the entire length of the shell for permitting the shell to be flattened. Separate means close each end of the shell and in turn are enclosed by the respective shell end, said shell and the latter means enclosing a volume sufficient to hold an amount of the produce salable to the consumer. The shell is provided with an opening and the jacket has an opening occupying the same longitudinal position as the opening in the shell. Consequently, by rotating the jacket on the shell the opening in the shell can be closed or exposed. The jacket includes a window circumferentially spaced from and occupying the same longitudinal position as the opening in the jacket to enable viewing the interior of the shell and the produce therein. A transparent cover is secured to the jacket at said window.

The closure means at each end of the shell preferably comprises a disk inserted into the shell and a side wall integral with the disk and having a circumference of 360° and of a sufficiently conically outward divergent shape to produce a tight fit between the wall and the inside surface of the shell. The closure means are inserted into the ends of the shell such that the disks face the interior of the shell.

The openings in the shell preferably are formed by bounding flaps that are bent into contact with the inside shell surface adjacent the opening and are fixed to the surface for stiffening the shell.

A plurality of the containers can be stacked side by side both horizontally and vertically and retained in aligned condition by securing neighboring containers together at their ends at their point of contact.

The invention will now be described in detail, with reference to the accompanying drawings, wherein:

FIG. 1 shows the container assembled, partly broken away;

FIG. 2 shows the shell flattened;

FIG. 3 shows the jacket flattened;

Figure 4:
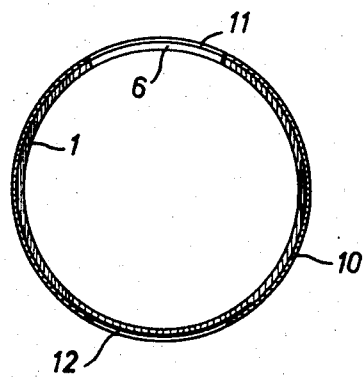
FIG. 4 is a transverse cross section of the shell and surrounding jacket.
Figure 5:
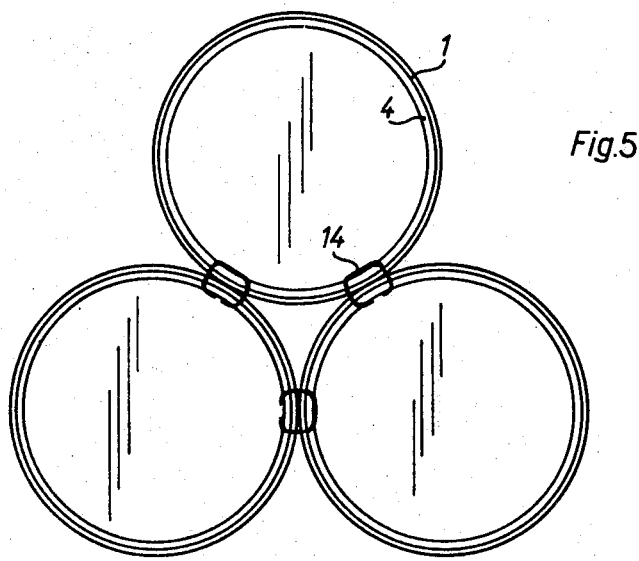
FIG. 5 is an end view of several containers stapled together for shipment.

Referring to FIG. 1, the container has a cylindrical shell 1 made of thin pasteboard or cardboard or from transparent, translucent, or opaque synthetic plastic. Each end of the shell is closed with a similarly designed closure in the shape of a disk that can be fitted inside the shell to form the bottom 2 and top 3 of the container. The material of the bottom and top is stiffer and/or thicker than that of the shell. Formed integrally with the top and bottom are slightly conical outwardly extending sides 4 of sufficient diameter to ensure a tight closure. The sides have a circumference of 360°. The top and bottom are pushed into the shell, the disk portion of the top and bottom facing into the interior of the shell, until a tight closure is obtained. The sides 4 of the end closures can then be stapled, or otherwise suitably securely attached, to the shell 1. The top 3 has a carrying loop 5.

As shown in FIGS. 2, 3, the shell is provided with a longitudinal opening 6 for filling and emptying. As a rule the opening is not punched out. Instead, a cut is made along the longitudinal line that will be in the middle of the final opening; and the two (customarily) semicircular ends are cut out to obtain the two flaps 7a, 7b. Parallel folding borders 9 are stamped along the longitudinal sides of the opening, to permit bending the flaps 7a, 7b back whereby they can be cemented or otherwise attached to the inside wall of the shell, where they act as stiffeners. In addition, two additional parallel folding borders 9 are stamped. One serves to indicate the precise line along which the above-noted longitudinal cut is made. The other cooperates with the top-most fold border 9 to permit flattening the shell. All of the borders 9 extend from end to end of the shell, as shown.

The flattened shell, illustrated at FIG. 2, incorporates a self-adhesive fold 8.

The shell of FIG. 1 is surrounded by a rotatable jacket 10, shown flattened in FIG. 3, made of paper or synthetic plastic sheet or film. The jacket and shell are in contact over their common areas. The jacket serves to open or close the opening 6 by turning, and for this purpose is provided with an opening 11 similar to opening 6. The jacket has also a window 12, of the same size and shape as openings 6 and 11, closed by a transparent sheet or film secured in any suitable manner to the jacket. As shown at FIG. 4, the window lies opposite the opening 11.

The jacket is provided with a self-adhesive fold 13.

The individual parts of the container, FIG. 1, are premade. The shell, as received from the manufacturer, FIG. 2, is cemented together along the self-adhesive fold 8 to form the cylinder. The jacket is then wrapped about the shell, making certain that the openings 6 and 11 register, and the jacket ends are cemented together along the self-adhesive fold 13. Because of the fold borders 9, the shell and jacket can now be pressed flat for bundling and shipping.

The tops and bottoms 2 and 3 can be nested for shipment, because of their slightly conical sides 4. Thus, the parts for the complete container require a minimum of space and can be conveniently stored until the simple assembly, which is done immediately before the container is to be filled.

Assembly is done quickly and by hand. With the left hands the sides are pushed out through the openings 6 and 11, to re-form the cylinder while the other hand pushes in the bottom 2 until a tight closure is obtained. The side 4 of the bottom is then fastened to the shell 1 at at least three different places equally spaced along the circumference. The top 3 is similarly secured in place. The container is now ready to be filled. To avoid fastening of the top and bottom to the jacket, the latter is made shorter than the shell, FIG. 1.

The container, after filling through the openings 6 and 11 in registry, is closed by turning the jacket 10 until the opening 6 is covered by the jacket wall. The contents of the container are thus protected against contamination, damage, and handling.

To inspect the contents or to put them on display, the jacket 10 is turned to bring the window 12 into registry with the opening 6.

The opening 11 and, if desired, the window 12 can be eliminated, and the jacket 10 pushed along the length of the shell 1 to expose the opening 6. If the window is eliminated, part or all of the jacket can be made transparent. The shell 1 can be provided with several openings, 6, particularly if the shell is long. The shell can also be comprised of several sections, in which case the shell may have several openings.

The jacket can be eliminated and the opening 6 provided with a self-adhesive transparent or opaque covering. The opening 6 itself can be eliminated, and the package filled through the end that will be covered by the top 3.

Figure 6:
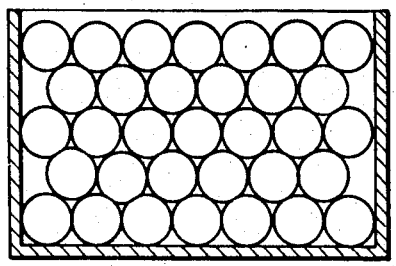
FIG. 6 shows the containers crated.

FIG. 6 shows the containers crated for shipment or storage. The containers make very efficient use of the space in the crate. When packed together, the containers should have their ends aligned and should be prevented from moving axially. If the containers are shipped in bulk, it is sufficient to staple together the ends of adjacent packages at their point of contact 14.

The advantages of the container of the invention lie in the appreciable simplification of the container itself, in the reduced damage during shipment and storage, in the reduced time from the grower to the distributer, in the savings in package and employee costs, as well as in the reduction or elimination of damaged contents. The contents are packed by the grower ready for sale, which make the package particularly suitable for self-service stores.

Although the empty package can be flattened to a negligible volume for discarding, it also can be further used after it has been emptied of its contents.

The package is not limited in use only to perishable or easily bruised produce, but is suitable for produce and products of the most varied kinds.

The container can be made in any desired size in accordance with the amount of the contents to be sold in the store.

I claim:

1. A container for shipping, storing, and selling produce, said container comprising a cylindrical shell of flexible material; two spaced parallel fold borders extending over the length of the shell for permitting the shell to be flattened; separate means closing each end of the shell and enclosed by the respective shell end, said shell and the latter means enclosing a volume sufficient to hold an amount of the produce saleable to the consumer, said shell being provided with an opening, and a cylindrical jacket surrounding said shell and in contact therewith over common surface areas thereof, said jacket having an opening occupying the same longitudinal position as the opening in said shell, said jacket being rotatable on said shell for closing and exposing said opening, said jacket including a window circumferentially spaced from, and occupying the same longitudinal position as said opening in the jacket; and a transparent cover for said window secured to said jacket.

2. The container according to claim 1, wherein said means comprises a disk inserted into each end of the shell; a side wall integral with the disk, said side wall having a circumference of 360° and being sufficiently conically outward divergent to produce a tight fit between said wall and the inside surface of the shell, said disk facing the interior of the shell.

3. The container according to claim 2, including staples for securing said wall to said shell.

4. The container according to claim 1, wherein said two openings and said window are of the same size and shape.

5. The container according to claim 1, wherein said opening in the shell has at least one bounding flap that is bent into contact with the inside shell surface adjacent the opening, and is fixed to said surface for stiffening the shell.

6. A plurality of containers as defined in claim 1 stacked side by side both horizontally and vertically, including means for keeping their ends aligned in a common plane.

7. The plurality of containers according to claim 6, wherein said means for keeping the ends aligned connect together neighboring containers at their ends at their point of contact.

8. The container according to claim 1, wherein said shell includes two longitudinal edges and a self-adhesive fold along one of said edges for cementing together said two edges.

9. The container according to claim 1, wherein said jacket includes two longitudinal edges and a self-adhesive fold along one of said edges for cementing together said two edges.

References Cited
UNITED STATES PATENTS

| | | | |
|---|---|---|---|
| 2,115,494 | 4/1938 | Lurssen | 206—45.31 |
| 2,275,542 | 3/1942 | Menges | 206—45.31 |
| 3,206,019 | 9/1965 | Curry. | |
| 3,262,559 | 7/1966 | Geiger | 206—45.31 |
| 1,545,771 | 7/1925 | Hout | 229—41 X |
| 1,576,672 | 3/1926 | Miller. | |

MARTHA L. RICE, *Primary Examiner.*

LOUIS G. MANCENE, *Examiner.*